(12) United States Patent
Inoue et al.

(10) Patent No.: US 10,112,616 B2
(45) Date of Patent: Oct. 30, 2018

(54) CONTROL DEVICE FOR VEHICLE

(71) Applicant: TOYOTA JIDOSHA KABUSHIKI KAISHA, Toyota-shi, Aichi-ken (JP)

(72) Inventors: Daisuke Inoue, Toyota (JP); Kazuya Sakamoto, Toyota (JP); Atsushi Ayabe, Toyota (JP); Satoshi Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 15/447,778

(22) Filed: Mar. 2, 2017

(65) Prior Publication Data
US 2017/0267249 A1    Sep. 21, 2017

(30) Foreign Application Priority Data

Mar. 16, 2016 (JP) .................................. 2016-052180

(51) Int. Cl.
| | |
|---|---|
| *B60W 30/19* | (2012.01) |
| *B60W 10/06* | (2006.01) |
| *B60W 10/107* | (2012.01) |
| *F16H 59/46* | (2006.01) |
| *F16H 61/688* | (2006.01) |
| *F16H 61/70* | (2006.01) |
| *F16H 37/08* | (2006.01) |
| *F16H 61/36* | (2006.01) |
| *F16H 61/04* | (2006.01) |

(52) U.S. Cl.
CPC ............ *B60W 30/19* (2013.01); *B60W 10/06* (2013.01); *B60W 10/107* (2013.01); *F16H 59/46* (2013.01); *F16H 61/0437* (2013.01); *F16H 61/36* (2013.01); *F16H 61/688* (2013.01); *F16H 61/702* (2013.01); *F16H 37/084* (2013.01); *F16H 2200/2064* (2013.01); *F16H 2306/44* (2013.01)

(58) Field of Classification Search
None
See application file for complete search history.

(56) References Cited

U.S. PATENT DOCUMENTS

2004/0144190 A1    7/2004 Hall

FOREIGN PATENT DOCUMENTS

| EP | 1262684 A1 | 12/2002 |
|---|---|---|
| EP | 1429049 A1 | 6/2004 |
| FR | 2972516 A1 | 9/2012 |
| JP | 2014-214791 A | 11/2014 |

*Primary Examiner* — Jacob S. Scott
(74) *Attorney, Agent, or Firm* — Oliff PLC

(57) ABSTRACT

In a power transmission device in which a first power transmission path is formed by engagement of a first clutch and a dog clutch and a second power transmission path is formed by engagement of a second clutch, the first clutch is released from a state where the first clutch and the dog clutch are engaged, and when a front-rear rotation speed difference of the dog clutch becomes equal to or greater than a predetermined value after the start of a clutch-to-clutch gear shift for engaging the second clutch, complete release control for releasing the first clutch to lower the torque capacity of the first clutch is performed.

2 Claims, 9 Drawing Sheets

CONTROL DEVICE FOR VEHICLE

INCORPORATION BY REFERENCE

The disclosure of Japanese Patent Application No. 2016-052180 filed on Mar. 16, 2016 including the specification, drawings and abstract is incorporated herein by reference in its entirety.

BACKGROUND

1. Technical Field

The present embodiment relates to a control device for a vehicle which controls a vehicle provided with a power transmission device.

2. Description of Related Art

As a power transmission device which is mounted in a vehicle, a power transmission device is known in which a first power transmission path for performing power transmission by meshing of gears and a second power transmission path for performing power transmission by a continuously variable transmission are provided in parallel as a power transmission path through which power from an engine (drive power source) is transmitted (for example, Japanese Patent Application Publication No. 2014-214791 (JP 2014-214791 A)). Such a power transmission device is provided with a first clutch provided on an upstream side of the continuously variable transmission (an upstream side in a power transmission direction), a second clutch provided on a downstream side of the continuously variable transmission, and a dog clutch provided in the power transmission path.

In such a power transmission device, a clutch-to-clutch gear shift for engaging and releasing the clutches is performed such that the first clutch is released and the second clutch is engaged.

Even in a power transmission device provided with a transmission of a type (multi-clutch type) of performing gear shift by switching a power transmission path through control of the engagement/disengagement of the first clutch and the second clutch, a clutch-to-clutch gear shift is performed.

SUMMARY

In a power transmission device which transmits power from an engine, shock at the time of a clutch-to-clutch gear shift occurs due to an input of the inertia torque and the engine torque of the engine when the rotation speed of the engine changes. Taking this into consideration, for example, when performing the clutch-to-clutch gear shift for releasing the first clutch from an engagement state and engaging the second clutch from a release state, in order to reduce shock, it is considered that the time of the start of change in input rotation speed of a transmission (so-called inertia phase start) is determined and the torque capacity of the first clutch on a release side is quickly lowered.

However, in the clutch-to-clutch gear shift, since the amount of change in input rotation speed at the time of the inertia phase start is small, it is difficult to accurately determine the inertia phase start. For this reason, the determination of the inertia phase start may be delayed, and if the determination of the inertia phase start is delayed, the timing to start to lower the torque capacity of the first clutch on the release side is delayed, and shock occurs.

The embodiment provides a control device for a vehicle capable of, in a vehicle provided with a power transmission device, which performs a clutch-to-clutch gear shift for arranging and releasing a first clutch and a second clutch, suppressing shock at the time of the clutch-to-clutch gear shift.

The embodiment is premised on a control device for a vehicle which is mounted in a vehicle provided with a power transmission device, in which a first power transmission path and a second power transmission path are provided in parallel as a power transmission path through which power from a drive power source is transmitted. The power transmission device is provided with a first clutch, a dog clutch, and a second clutch configured to selectively switch between the first power transmission path and the second power transmission path. The first power transmission path is formed by engagement of the first clutch and the dog clutch, and the second power transmission path is formed by engagement of the second clutch.

The control device for a vehicle includes a rotation speed difference acquisition unit configured to acquire a front-rear rotation speed difference which is the difference between a rotation speed of the dog clutch on an upstream side in a power transmission direction and a rotation speed of the dog clutch on a downstream side in the power transmission direction, and a control unit configured to, when the front-rear rotation speed difference of the dog clutch becomes equal to or greater than a predetermined value after the start of a clutch-to-clutch gear shift for releasing the first clutch from a state where the first clutch and the dog clutch are engaged and engaging the second clutch, perform complete release control of the first clutch. An aspect of the embodiment may be defined as follows. An aspect of the embodiment provides a control device for a vehicle provided with a power transmission device, the power transmission device including a first clutch, a dog clutch, and a second clutch, the power transmission device configured to be selectively switched between a first power transmission path and a second power transmission path, the first power transmission path and the second power transmission path being provided in parallel, such that i) when the first clutch is engaged and the dog clutch is engaged, power from a drive power source is transmitted through the first power transmission path and ii) when the second clutch is engaged, power from the drive power source is transmitted through the second power transmission path, and the control device including an electronic control unit configured to i) acquire a front-rear rotation speed difference which is the difference between a rotation speed of the dog clutch on an upstream side in a power transmission direction and a rotation speed of the dog clutch on a downstream side in the power transmission direction, and ii) when the front-rear rotation speed difference becomes equal to or greater than a predetermined value after a start of clutch-to-clutch gear shift control, perform complete release control of the first clutch, the clutch-to-clutch gear shift control being control for releasing the first clutch and engaging the second clutch from a state where the first clutch is engaged and the dog clutch is engaged.

Next, the operation of the embodiment will be described. First, the dog clutch which is engaged when forming the first power transmission path has a backlash inherent therein, and during the clutch-to-clutch gear shift, if an inertia phase is started, a direction of eliminating backlash of the dog clutch is reversed. When the direction of eliminating a backlash is reversed, the front-rear rotation speed difference which is the difference between the rotation speed of the dog clutch on the upstream side and the rotation speed of the dog clutch on the downstream side becomes large.

In this way, since an increase in the front-rear rotation speed difference of the dog clutch during the clutch-to-clutch gear shift means that the direction of eliminating a backlash is reversed, that is, the inertia phase starts in the clutch-to-clutch gear shift, in a case where the front-rear rotation speed difference of the dog clutch becomes equal to or greater than the predetermined value, it is possible to accurately determine the inertia phase start.

Accordingly, in a case where the front-rear rotation speed difference of the dog clutch becomes equal to or greater than the predetermined value, the complete release control of the first clutch is performed, whereby it is possible to make the timing to start the complete release control of the first clutch conform to the inertia phase start. With this, it is possible to suppress shock at the time of the clutch-to-clutch gear shift.

In the embodiment, when the front-rear rotation speed difference of the dog clutch becomes equal to or greater than the predetermined value after the start of the clutch-to-clutch gear shift, the complete release control of the first clutch is performed, and input torque-down control for lowering input torque to the power transmission device may be further performed. In this way, the complete release control of the first clutch and the input torque-down control are performed when the front-rear rotation speed difference of the dog clutch becomes equal to or greater than the predetermined value (at the time of the inertia phase start), whereby it is possible to suppress shock and to achieve reduction in gear shift time.

According to the embodiment, in a vehicle provided with a power transmission device, which performs a clutch-to-clutch gear shift for engaging and releasing a first clutch and a second clutch, it is possible to suppress shock at the time of the clutch-to-clutch gear shift.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
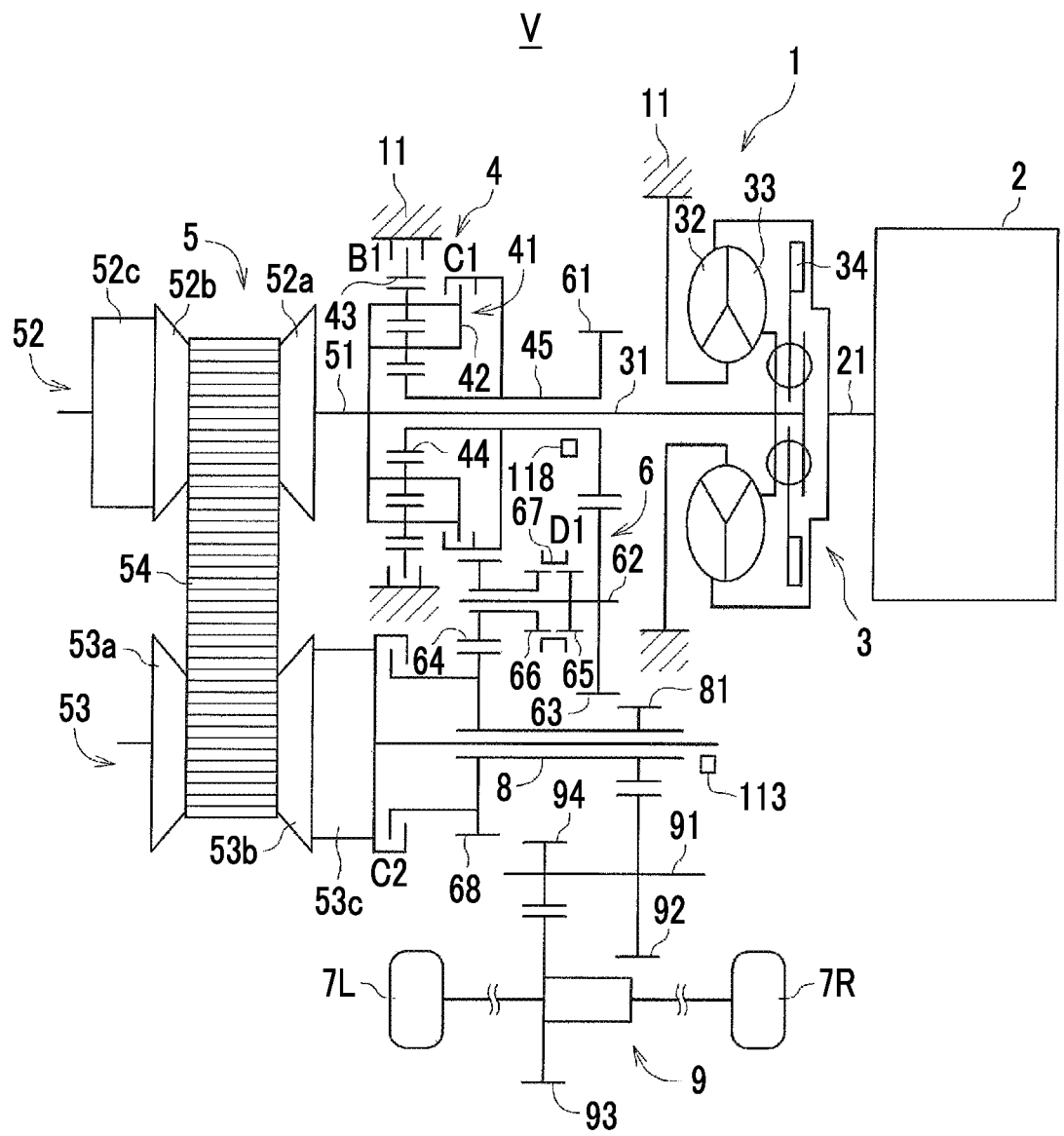
FIG. 1 is a schematic view showing the schematic configuration of a power transmission device provided in a vehicle, to which a control device of the embodiment is applied.

Hereinafter, an embodiment will be described referring to the drawings. First, an example of a power transmission device provided in a vehicle V, to which control device of the embodiment is applied, will be described referring to FIG. 1.

A power transmission device 1 of this example is a device which transmits torque (power) from an engine 2 (mounted in the vehicle V) as a drive power source for traveling to drive wheels 7L, 7R, and is provided with a torque converter 3, a forward-reverse switching device 4, a belt type continuously variable transmission 5 (hereinafter, simply referred to as "continuously variable transmission 5"), a gear mechanism 6, an output shaft 8 provided with an output gear 81, a differential device 9, and the like.

In the power transmission device 1, a first power transmission path (power transmission path for gear traveling) in which power transmission is performed by meshing of gears and a second power transmission path (power transmission path for belt traveling) in which power transmission is performed by the continuously variable transmission 5 are provided in parallel.

Specifically, in the first power transmission path, torque (input torque) output from the engine 2 is input to a turbine shaft 31 by way of the torque converter 3, and the torque is transmitted from the turbine shaft 31 to the output shaft 8 by way of the forward-reverse switching device 4 and the gear mechanism 6. In the second power transmission path, the torque input to the turbine shaft 31 is transmitted to the output shaft 8 by way of the continuously variable transmission 5. Then, the power transmission path is switched between the first power transmission path and the second power transmission path according to the traveling state of the vehicle. A configuration for switching the power transmission path will be described below.

The engine 2 is a known power device which combusts fuel and outputs power, such as a gasoline engine, and is configured to control an operation state, for example, a throttle opening (intake air amount) of a throttle valve provided in an intake passage, a fuel injection amount, or an ignition timing. The operation state of the engine 2 is controlled by an electronic control unit (ECU) 100 (see FIG. 3). The ECU 100 executes various kinds of control of the engine 2 including the above-described intake air amount control, fuel injection amount control, ignition timing control, and the like.

The torque converter 3 is provided with a pump impeller 32 coupled to a crank shaft 21 of the engine 2, and a turbine impeller 33 coupled to the forward-reverse switching device 4 through the turbine shaft 31. A lockup clutch 34 is provided between the pump impeller 32 and the turbine impeller 33. The lockup clutch 34 is completely engaged, whereby the pump impeller 32 and the turbine impeller 33 rotate integrally.

The forward-reverse switching device 4 is provided with a forward clutch (clutch for gear traveling) C1, a reverse brake B1, a double-pinion type planetary gear device 41. A carrier 42 of the planetary gear device 41 is coupled integrally to the turbine shaft 31 and an input shaft 51 of the continuously variable transmission 5, a ring gear 43 is selectively coupled to a housing 11 through the reverse brake B1, and a sun gear 44 is coupled to a small-diameter gear 61 through a planetary output shaft 45. The sun gear 44 and the carrier 42 are selectively coupled through the forward clutch C1. Both of the forward clutch C1 and the reverse brake B1 are wet clutches, and are hydraulic frictional engagement elements which are frictionally engaged by a hydraulic actuator. Hereinafter, the forward clutch C1 is referred to as a C1 clutch. The C1 clutch provided on an upstream side of the continuously variable transmission 5 (an upstream side in a power transmission direction) is an example of a "first clutch" of the embodiment.

The gear mechanism 6 is provided with the small-diameter gear 61, and a large-diameter gear 63 which meshes with the small-diameter gear 61 and is provided relatively unrotatably with respect to a first counter shaft 62. Around the same rotational axis as the first counter shaft 62, an idler gear 64 is provided relatively unrotatably with respect to the first counter shaft 62. A dog clutch D1 is provided between the first counter shaft 62 and the idler gear 64 to selectively engage and disengage the first counter shaft 62 and the idler gear 64.

The dog clutch D1 is provided with a first gear 65 which is formed in the first counter shaft 62, a second gear 66 which is formed in the idler gear 64, and a hub sleeve 67 which has spline teeth meshable with the first gear 65 and the second gear 66. The hub sleeve 67 is engaged with the first gear 65 and the second gear 66, whereby the first counter shaft 62 and the idler gear 64 are connected. The dog clutch D1 is provided with a synchromesh mechanism (not shown) which synchronizes rotation when the hub sleeve 67 is engaged with both gears 65, 66. The dog clutch D1 is a backlash element which has a backlash inherent therein.

The idler gear 64 meshes with an input gear 68 having a diameter larger than the idler gear 64. The input gear 68 is provided relatively unrotatably with respect to the output shaft 8 provided on the common rotational axis as the rotational axis of a secondary pulley 53 of the continuously variable transmission 5. The output shaft 8 is provided rotatably around the rotational axis, and the input gear 68 and the output gear 81 are provided relatively unrotatably. The C1 clutch and the dog clutch D1 are engaged simultaneously and a C2 clutch described below is released, whereby the first power transmission path through which the torque of the engine 2 is transmitted to the output shaft 8 by way of the turbine shaft 31, the forward-reverse switching device 4, and the gear mechanism 6 is formed.

The continuously variable transmission 5 is provided with a primary pulley 52 which is an input-side member provided on the power transmission path between the input shaft 51 coupled to the turbine shaft 31 and the output shaft 8 and is provided in the input shaft 51, a secondary pulley 53 which is an output-side member, and a transmission belt 54 which is wound between a pair of pulleys 52, 53, and power transmission is performed through friction force between a pair of pulleys 52, 53 and the transmission belt 54.

The primary pulley 52 is provided with a fixed sheave 52*a* which is fixed to the input shaft 51, a movable sheave 52*b* which is provided relatively unrotatably around the axis with respect to the input shaft 51 and movably in an axial direction, and a primary-side hydraulic actuator 52*c* which generates thrust for moving the movable sheave 52*b* in order to change a V groove width between the fixed sheave 52*a* and the movable sheave 52*b*. The secondary pulley 53 is provided with a fixed sheave 53*a*, a movable sheave 53*b* which is provided relatively unrotatably around the axis with respect to the fixed sheave 53*a* and movably in the axial direction, and a secondary-side hydraulic actuator 53*c* which generates thrust for moving the movable sheave 53*b* in order to change a V groove width between the fixed sheave 53*a* and the movable sheave 53*b*.

A winding diameter (effective diameter) of the transmission belt 54 is varied with change in the V groove width of a pair of pulleys 52, 53, whereby a gear ratio γ (=input shaft rotation speed Nin/output shaft rotation speed Nout) becomes continuously variable.

A clutch C2 for belt traveling is provided between the continuously variable transmission 5 and the output shaft 8 to selectively engage and disengage the continuously variable transmission 5 and the output shaft 8. Hereinafter, the clutch C2 for belt traveling is referred to as a C2 clutch. The C2 clutch is also a wet clutch, and is a hydraulic frictional engagement element which is frictionally engaged by a hydraulic actuator. The C2 clutch is engaged and the C1 clutch is released, whereby the second power transmission path through which the torque of the engine 2 is transmitted to the output shaft 8 by way of the input shaft 51 and the continuously variable transmission 5 is formed. The C2 clutch provided on a downstream side of the continuously variable transmission 5 (a downstream side in the power transmission direction) is an example of a "second clutch" of the embodiment.

The output gear 81 meshes with a large-diameter gear 92 which is fixed to second counter shaft 91. In the second counter shaft 91, a small-diameter gear 94 which meshes with a differential ring gear 93 of the differential device 9 is provided. The differential device 9 is constituted of a known differential mechanism.

Figure 2:
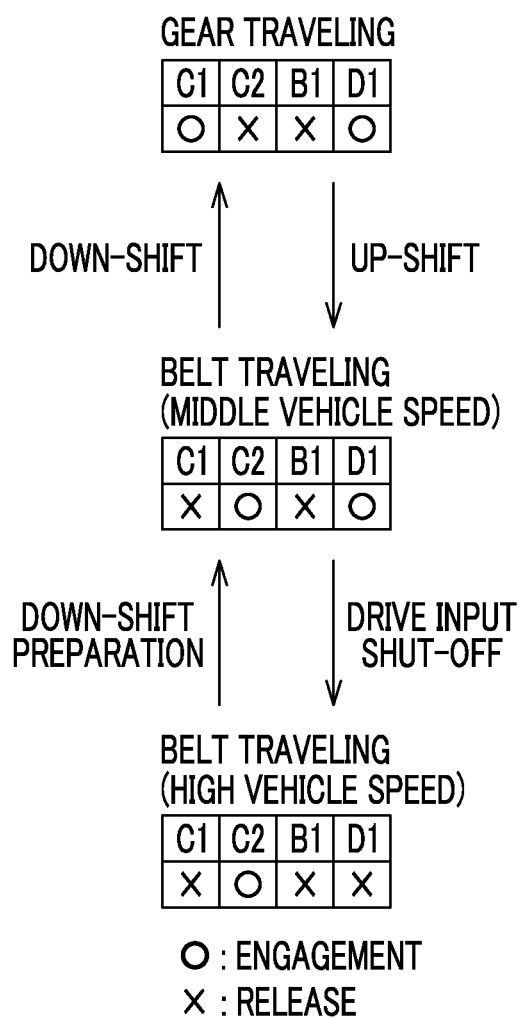
FIG. 2 is a diagram showing an engagement table of engagement elements for each traveling pattern by the power transmission device.

In the power transmission device 1 having the above-described configuration, as shown in FIG. 2, through control of the engagement (○) and release (×) of the C1 clutch, the C2 clutch, and the dog clutch D1, it is possible to switch between a case where torque is transmitted through the first power transmission path on a low speed stage side (in a case of gear traveling) and a case where torque is transmitted through the second power transmission path (in a case of belt traveling (middle vehicle speed and high vehicle speed)) on a high speed stage side.

As shown in FIG. 2, in a case of gear traveling, the C1 clutch and the dog clutch D1 are engaged (the C2 clutch and the reverse brake B1 are released). If the C1 clutch is engaged, the planetary gear device 41 constituting the forward-reverse switching device 4 rotates integrally. With this, the small-diameter gear 61 rotates at the same rotation speed as the turbine shaft 31. The dog clutch D1 is engaged, whereby the first counter shaft 62 and the idler gear 64 are connected and rotate integrally. Accordingly, the C1 clutch and the dog clutch D1 are engaged, whereby the first power transmission path is established and the torque of the engine 2 is transmitted to the output shaft 8 and the output gear 81 by way of the torque converter 3, the turbine shaft 31, the forward-reverse switching device 4, the gear mechanism 6, the idler gear 64, and the input gear 68. In addition, the torque transmitted to the output gear 81 is transmitted to the right and left drive wheels 7L, 7R by way of the large-diameter gear 92, the small-diameter gear 94, and the differential device 9.

The gear traveling is selected in a low vehicle speed region. A gear ratio (a rotation speed Nt of the turbine shaft 31/a rotation speed Nout of the output shaft 8) when power transmission is performed through the first power transmission path is set to a value greater than a maximum gear ratio γmax of the continuously variable transmission 5. That is, the gear ratio (1st) in the first power transmission path is set to a value which is not established in the continuously variable transmission 5. In the continuously variable transmission 5, a gear ratio of 2nd or more is set.

Next, in a case of switching from gear traveling to belt traveling (in a case of switching from the first power transmission path on the low speed stage side to the second power transmission path on the high speed stage side (in a case of an up-shift)), a clutch-to-clutch gear shift is performed. That is, clutch switching to operate the C1 clutch in the engagement state to the release side and to operate the C2 clutch in the release state to the engagement side in interlocking therewith is performed.

With such a clutch-to-clutch (C1-to-C2) gear shift, if the C2 clutch is engaged (the C1 clutch and the reverse brake B1 are released; see FIG. 2), the secondary pulley 53 and the output shaft 8 are connected, and thus, the secondary pulley 53, the output shaft 8, and the output gear 81 rotate integrally. With this, the second power transmission path is established and the torque of the engine 2 is transmitted to the output shaft 8 and the output gear 81 by way of the torque converter 3, the turbine shaft 31, the input shaft 51, and the continuously variable transmission 5. In addition, the torque transmitted to the output gear 81 is transmitted to the right and left drive wheels 7L, 7R by way of the large-diameter gear 92, the small-diameter gear 94, and the differential device 9.

When switching from gear traveling to belt traveling (high vehicle speed), as shown in FIG. 2, switching is performed by way of belt traveling (middle vehicle speed) transitionally. During the transitional belt traveling (middle vehicle speed), the dog clutch D1 is in the engagement state. Then, after having passed through such belt traveling (middle vehicle speed), in order to prevent unnecessary drag of the gear mechanism 6 or the like or high-speed rotation in the planetary gear device 41, the dog clutch D1 is released (driven input shut-off).

Figure 3:
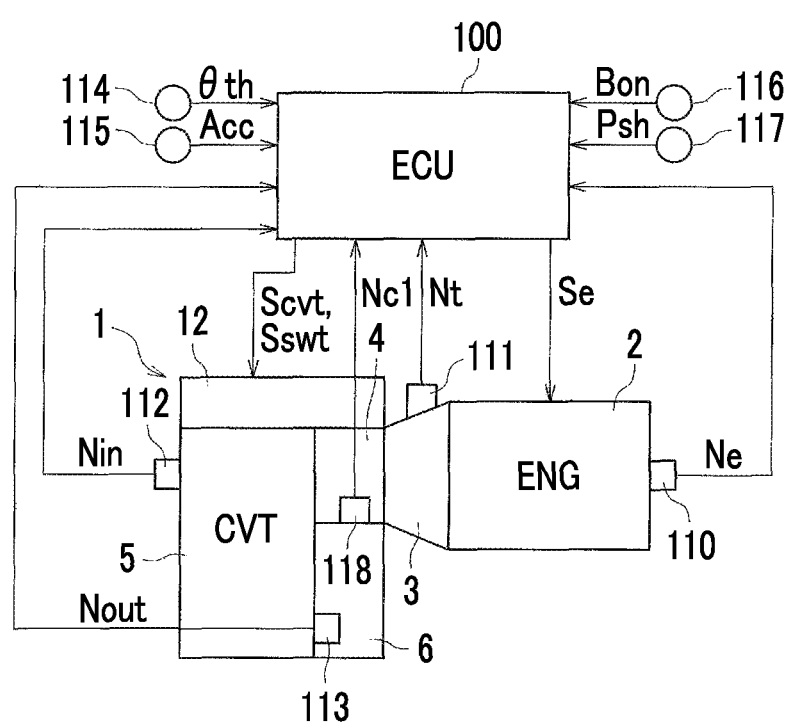
FIG. 3 is a block diagram showing a control system of the power transmission device and an engine.

FIG. 3 is a block diagram showing the configuration of a control system of the power transmission device 1 and the engine 2 provided in the vehicle V. The ECU 100 includes a microcomputer provided with, for example, a CPU, a RAM, a ROM, an input/output interface, and the like.

The ECU 100 is configured to perform output control (output torque control) of the engine 2, gear ratio control and belt clamping force control of the continuously variable transmission 5, control for switching the power transmission path of the power transmission device 1, and the like. Furthermore, as described below, the ECU 100 also executes shock suppression control at the time of the clutch-to-clutch gear shift.

To the ECU 100, signals representing a rotation angle (position) Acr of the crank shaft 21 and a rotation speed (engine rotation speed) Ne of the engine 2 detected by an engine rotation speed sensor 110, a signal representing a rotation speed (turbine rotation speed) Nt of the turbine shaft 31 detected by a turbine rotation speed sensor 111, a signal representing the input shaft rotation speed Nin which is the rotation speed of the input shaft 51 of the continuously variable transmission 5 detected by an input shaft rotation speed sensor 112, a signal representing the output shaft rotation speed Nout which is the rotation speed of the output shaft 8 corresponding to a vehicle speed V detected by an output shaft rotation speed sensor 113, a signal representing a throttle opening θth of an electronic throttle valve detected by a throttle sensor 114, a signal representing an accelerator pedal angle Acc which is an operation amount of an accelerator pedal as a required amount of acceleration of a driver detected by an accelerator pedal angle sensor 115, a signal representing brake on Bon indicating the operation of a foot brake as a normal brake detected by a foot brake switch 116, a signal representing a shift position (operation position) Psh of a shift lever detected by a shift position sensor 117, a signal representing a rotation speed Nc1 of the planetary output shaft 45 (that is, the rotation speed on the output side of the C1 clutch) detected by a planetary output shaft rotation speed sensor 118, and the like are respectively supplied. For example, the ECU 100 sequentially calculates the gear ratio γ (=Nin/Nout) of the continuously variable transmission 5 based on the output shaft rotation speed Nout and the input shaft rotation speed Nin.

From the ECU 100, an engine output control command signal Se for the output control of the engine 2, a hydraulic control command signal Scvt for hydraulic control of the continuously variable transmission 5, a hydraulic control command signal Sswt to the forward-reverse switching device 4 (the C1 clutch and the reverse brake B1), the C2 clutch, and the dog clutch D1 involving in switching of the power transmission path of the power transmission device 1, and the like are respective output.

Specifically, as the engine output control command signal Se, a throttle signal for controlling opening and closing of the throttle valve of the engine 2, an injection signal for controlling the amount of fuel injected from an injector, an ignition timing signal for controlling an ignition timing of an ignition plug, or the like is output.

As the hydraulic control command signal Scvt, a command signal (a command signal of indicated hydraulic pressure) for driving a SLP solenoid valve (not shown) regulating hydraulic pressure supplied to the primary-side hydraulic actuator 52*c*, a command signal (a command signal of indicated hydraulic pressure) for driving a SLS solenoid valve (not shown) regulating hydraulic pressure supplied to the secondary-side hydraulic actuator 53*c*, or the like is output to a hydraulic control circuit 12. The SLP solenoid valve is operated and the SLS solenoid valve is operated in response to the respective command signals.

As the hydraulic control command signal Sswt, a command signal (a command signal of indicated hydraulic pressure) for driving each linear solenoid valve controlling hydraulic pressure supplied to a hydraulic actuator of each of the C1 clutch, the reverse brake B1, the C2 clutch, the dog clutch D1, and the synchromesh mechanism, or the like is output to the hydraulic control circuit 12.

As the linear solenoid valve, a SL1 solenoid valve (not shown) performing hydraulic adjustment for switching among engagement, semi-engagement, and release of the C1 clutch, and a SL2 solenoid valve (not shown) performing hydraulic adjustment for switching among engagement, semi-engagement, and release of the C2 clutch are provided.

Next, the shock suppression control at the time of the clutch-to-clutch gear shift which is executed by the ECU 100 will be described. First, in the power transmission device 1 having the above-described configuration, shock at the time of the clutch-to-clutch (C1-to-C2) gear shift occurs due to an input to the power transmission device 1 of the inertia torque and the engine torque of the engine 2 when the rotation speed of the engine 2 changes. Taking this into consideration, when performing the clutch-to-clutch gear shift, in order to reduce shock, it is considered that the time of the start of change in input rotation speed of the continuously variable transmission 5 (so-called inertia phase start) is determined and the torque capacity of the C1 clutch on the release side is quickly lowered.

However, since the C2 clutch on the engagement side when performing the clutch-to-clutch gear shift is on the downstream side of the continuously variable transmission 5

Figure 9:
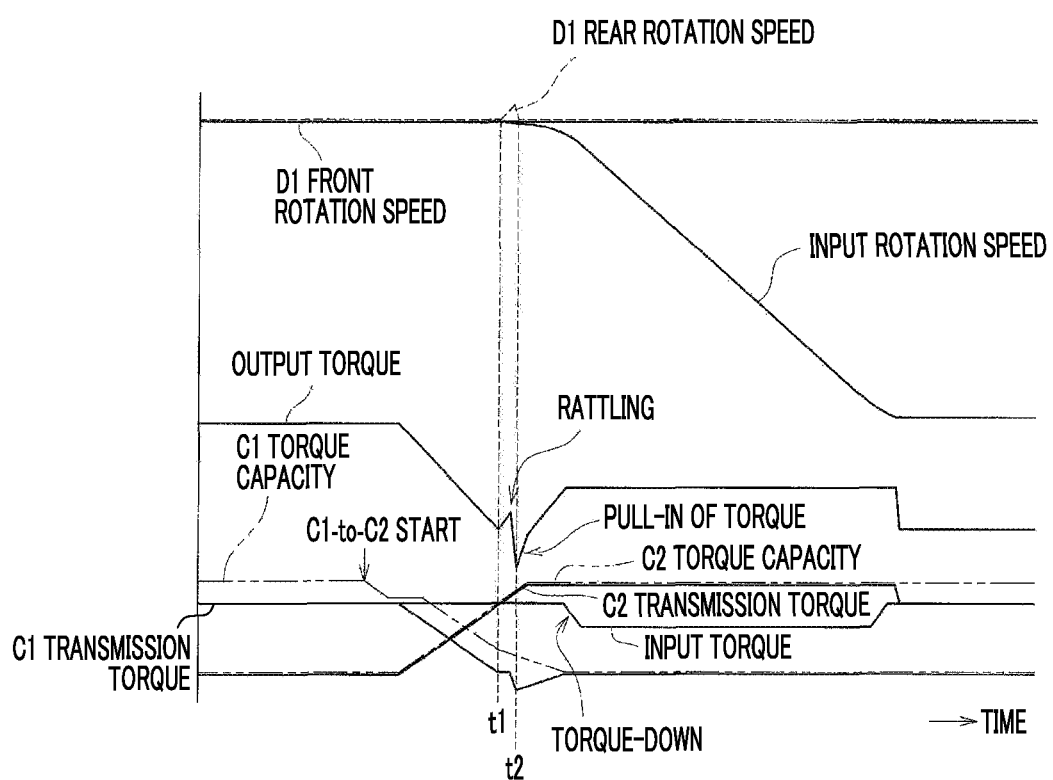
FIG. 9 is an explanatory view of shock occurring at the time of the clutch-to-clutch gear shift.

(the downstream side in the power transmission direction), and accordingly, has a large moment of inertia, in the clutch-to-clutch gear shift, change in input rotation speed at the time of the inertia phase start becomes gentle (see change in input rotation speed after t1 of FIG. 9). For this reason, it is difficult to accurately determine the inertia phase start, and the determination of the inertia phase start is delayed. If the determination of the inertia phase start is delayed, the timing at which the torque capacity of the C1 clutch on the release side is lowered is delayed, and shock occurs.

Such shock at the time of a gear shift will be specifically described referring to the timing chart of FIG. 9. In the description, the torque capacity and the transmission torque of the C1 clutch are respectively referred to as C1 torque capacity and C1 transmission torque. Furthermore the torque capacity and the transmission torque of the C2 clutch are respectively referred to as C2 torque capacity and C2 transmission torque. In addition, the rotation speed on the input side and the rotation speed on the output side of the dog clutch D1 are respectively referred to as a D1 front rotation speed and a D1 rear rotation speed.

The torque capacity refers to maximum torque which is transmittable from each clutch of the C1 clutch and the C2 clutch. The transmission torque refers to torque which is actually transmitted from each clutch of the C1 clutch and the C2 clutch.

First, in the power transmission device 1, during gear traveling in which torque is transmitted through the first power transmission path on the low speed stage side, as shown in FIG. 9, the D1 front rotation speed and the D1 rear rotation speed are made equal, and the direction of eliminating a backlash of the dog clutch D1 is a positive direction (drive side).

If the clutch-to-clutch (C1-to-C2) gear shift starts in order to transition to belt traveling from this state, the C1 torque capacity decreases and the C2 torque capacity increases. From the time (t1) when the increasing C2 torque capacity reaches the input torque to the continuously variable transmission 5, the C2 transmission torque is applied (inertia phase start), the D1 rear rotation speed becomes higher than the D1 front rotation speed (t1 to t2), and the direction of eliminating a backlash of the dog clutch D1 is reversed to a negative direction (driven side). When the direction of eliminating a backlash of the dog clutch D1 is reversed, if the C1 torque capacity remains (if the timing at which the C1 torque capacity is lowered is late), rattling occurs and the output torque of the output shaft 8 changes. In addition, when a backlash of the dog clutch D1 is eliminated by reversing of the direction of eliminating a backlash, if the C1 torque capacity remains, the C1 transmission torque (negative torque) occurs and pull-in of the output torque occurs. In this way, at the time of the clutch-to-clutch gear shift, if the timing at which the C1 torque capacity is lowered is delayed with respect to the inertia phase start (t1), shock occurs. Furthermore, if torque-down control of the input torque is delayed with respect to the time of the inertia phase start, the gear shift time is extended.

In order to solve such a problem, in this embodiment, at the time of the clutch-to-clutch gear shift, control capable of accurately determining the inertia phase start and suppressing shock is realized.

Figure 4:
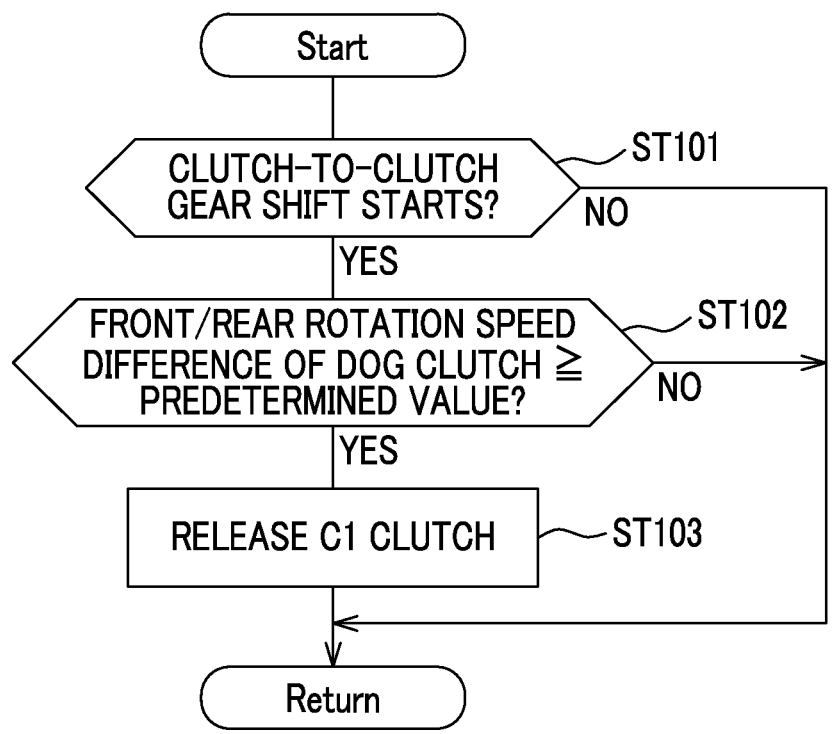
FIG. 4 is a flowchart showing an example of shock suppression control at the time of a clutch-to-clutch gear shift.

An example of this control (the shock suppression control at the time of the clutch-to-clutch gear shift) will be described referring to the flowchart of FIG. 4. A control routine of FIG. 4 is repeatedly executed in the ECU 100 at every predetermined time (for example, several msec).

Prior to describing the control routine of FIG. 4, calculation of a front-rear rotation speed difference of the dog clutch D1 used for determination in Step ST102 of the control routine will be described.

The front-rear rotation speed difference of the dog clutch D1 refers to the difference (the upstream-side rotation speed−the downstream-side rotation speed) between the rotation speed on the upstream side (on the upstream side in the power transmission direction) and the rotation speed on the downstream side of the dog clutch D1.

The rotation speed on the upstream side of the dog clutch D1 is calculated by multiplying the rotation speed Nc1 of the planetary output shaft 45 obtained from the output signal of the planetary output shaft rotation speed sensor 118 by the gear ratio of the small-diameter gear 61 and the large-diameter gear 63 of the gear mechanism 6 (a reciprocal of the ratio of the number of teeth of the small-diameter gear 61 to the number of teeth of the large-diameter gear 63).

The rotation speed on the downstream side of the dog clutch D1 is calculated by multiplying the output shaft rotation speed Nout obtained from the output signal of the output shaft rotation speed sensor 113 by the gear ratio of the input gear 68 of the output shaft 8 and the idler gear 64 of the gear mechanism 6 (a reciprocal of the ratio of the number of teeth of the input gear 68 to the number of teeth of the idler gear 64).

The front-rear rotation speed difference of the dog clutch D1 may be calculated by respectively providing rotation speed sensors in the input shaft and the output shaft of the dog clutch D1 and determining the difference between two rotation speeds from the respective rotation speed sensors (the upstream-side rotation speed and the downstream-side rotation speed of the dog clutch D1).

The calculation processing of the front-rear rotation speed difference of the dog clutch D1 which is executed in the ECU 100 corresponds to processing as a "rotation speed difference acquisition unit" of the embodiment.

If the control routine of FIG. 4 is started, first, in Step ST101, it is determined whether or not the clutch-to-clutch (C1-to-C2) gear shift is started, and in a case where the determination result is negative (No), the routine is returned. In a case where the determination result of Step ST101 is affirmative (YES) (after the start of the clutch-to-clutch gear shift), the processing progresses to Step ST102.

In Step ST102, the front-rear rotation speed difference of the dog clutch D1 is calculated by the above-described calculation processing, and it is determined whether or not the front-rear rotation speed difference is equal to or greater than a predetermined value. In a case whether the determination result is negative (NO), the routine is returned.

In regard to the predetermined value used for the determination of Step ST102, considering that the outputs of the rotation speed sensors (the planetary output shaft rotation speed sensor 118 and the output shaft rotation speed sensor 113) fluctuate due to the influence of noise, a value (rotation speed) greater than the amount of fluctuation in rotation speed due to noise is set as the predetermined value. The front-rear rotation speed difference is determined using this predetermined value, whereby it is possible to eliminate the influence of sensor noise. For this reason, it is possible to reliably determine whether or not the rotation speed on the downstream side of the dog clutch D1 becomes higher than the rotation speed on the upstream side of the dog clutch D1 (the direction of eliminating a backlash is reversed).

Then, in a case where the determination result of Step ST102 is affirmative (YES) (in a case where the relationship of [the front-rear rotation speed difference≥the predetermined value] is established), this means that the direction of eliminating a backlash described above is reversed, that is, the C2 transmission torque is applied in the clutch-to-clutch gear shift and the inertia phase starts. For this reason, when the determination result of Step ST102 is affirmative (YES), it is determined to be the time of the inertia phase start, whereby it is possible to accurately determine the inertia phase start. Then, when the inertia phase start is determined in this way, the C1 clutch is released (Step ST103). Specifically, complete release control for draining the hydraulic pressure of the C1 clutch to quickly lower the C1 torque capacity is performed.

Step ST101 to Step ST103 described above are executed by the ECU 100, whereby a "control unit" of the embodiment is realized.

Next, a specific example of the shock suppression control at the time of the clutch-to-clutch gear shift will be described referring to the timing chart of FIG. 5.

In the following description, the torque capacity and the transmission torque of the C1 clutch are respectively referred to C1 torque capacity and C1 transmission torque. Furthermore, the torque capacity and the transmission torque of the C2 clutch are respectively referred to as C2 torque capacity and C2 transmission torque. In addition, the rotation speed on the input side and the rotation speed on the output side of the dog clutch D1 are respectively referred to as the D1 front rotation speed and the D1 rear rotation speed.

Figure 5:
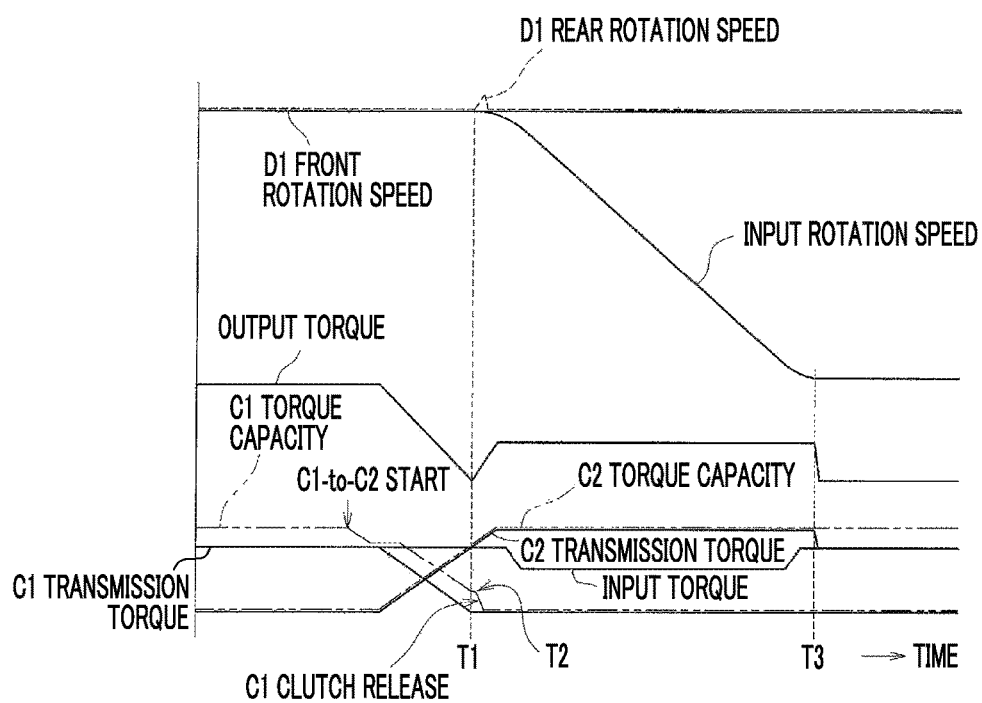
FIG. 5 is a timing chart showing an example of the shock suppression control at the time of the clutch-to-clutch gear shift.

First, if the clutch-to-clutch (C1-to-C2) gear shift starts in order to transition from gear traveling to belt traveling, as shown in FIG. 5, the C1 torque capacity decreases and the C2 torque capacity increases. From the time T1 when the increasing C2 torque capacity reaches the input torque to the continuously variable transmission 5, the C2 transmission torque is applied (inertia phase start), and the D1 rear rotation speed becomes higher than the D1 front rotation speed (reversing of the direction of eliminating a backlash starts). Then, at the time T2 when the front-rear rotation speed difference of the dog clutch D1 becomes equal to or greater than the predetermined value (the time when the determination of Step ST102 of the control routine of FIG. 4 is YES), it is determined that the inertia phase starts, and the C1 clutch is released (the hydraulic pressure of the C1 clutch is drained) to quickly lower the C1 torque capacity. The C1 torque capacity is lowered, whereby rattling and pull-in of torque shown in FIG. 9 are improved. With this, it is possible to suppress shock at the time of the clutch-to-clutch gear shift.

As described above, according to this embodiment, in the clutch-to-clutch (C1-to-C2) gear shift, since it is determined to be the time of the inertia phase start when the front-rear rotation speed difference of the dog clutch D1 becomes equal to or greater than the predetermined value, it is possible to accurately determine the time of the inertia phase start. Accordingly, after the front-rear rotation speed difference of the dog clutch D1 becomes equal to or greater than the predetermined value during the clutch-to-clutch gear shift, the complete release control of the first clutch is performed, whereby it is possible to make the timing to start the complete release control of the first clutch conform to the inertia phase start. With this, it is possible to suppress shock at the time of the clutch-to-clutch gear shift.

Next, another example of the shock suppression control at the time of the clutch-to-clutch gear shift which is executed by the ECU 100 will be described referring to the flowchart of FIG. 6. A control routine of FIG. 6 is repeatedly executed in the ECU 100 at every predetermined time (for example, several msec).

Figure 6:
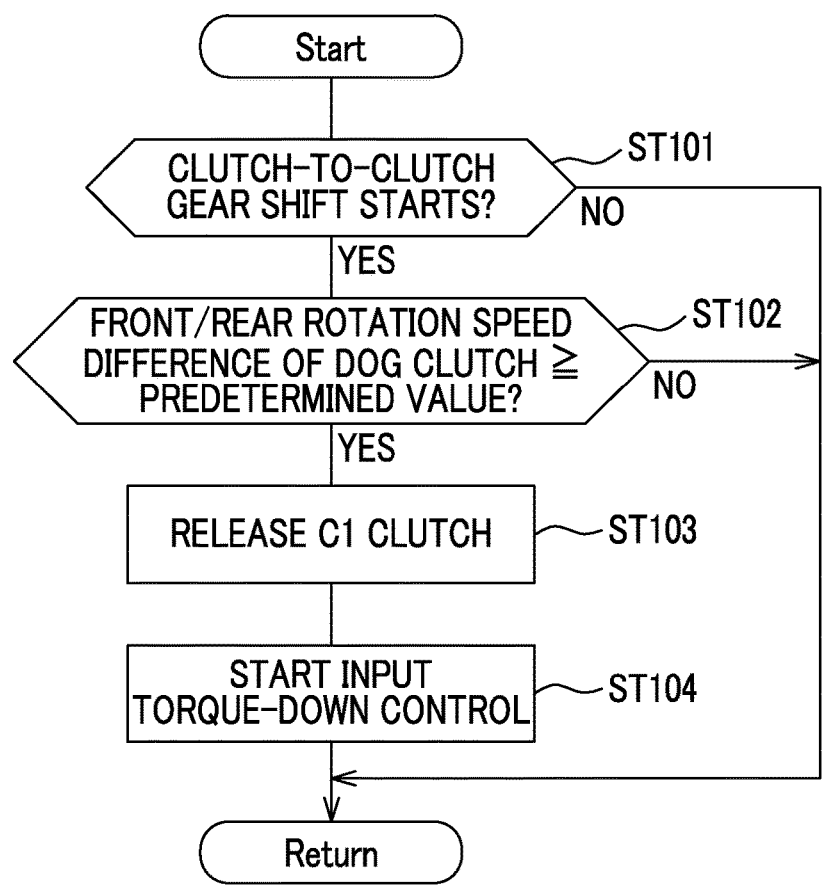
FIG. 6 is a flowchart showing another example of the shock suppression control at the time of the clutch-to-clutch gear shift.

The processing details of Step ST101 to Step ST102 of the control routine of FIG. 6 are the same as those of Step ST101 to Step ST102 of the control routine of FIG. 4 described above, and thus, detailed description thereof will not be repeated.

In this example, at the time when the determination result of Step ST102 is affirmative (YES) (the time when the relationship of [the front-rear rotation speed difference of the dog clutch D1≥the predetermined value] is established), it is determined to be the time of the inertia phase start, and the C1 clutch is released (Step ST103). Specifically, the complete release control for draining the hydraulic pressure of the C1 clutch to quickly lower the C1 torque capacity is performed. In addition, in addition to the complete release control of the C1 clutch, the input torque-down control starts (Step ST104). As the input torque-down control, for example, control for performing any one or a plurality of kinds of ignition timing delay of the engine 2, a decrease in the intake air amount, and a decrease in the fuel injection amount to lower the output torque of the engine 2 may be exemplified.

Figure 7:
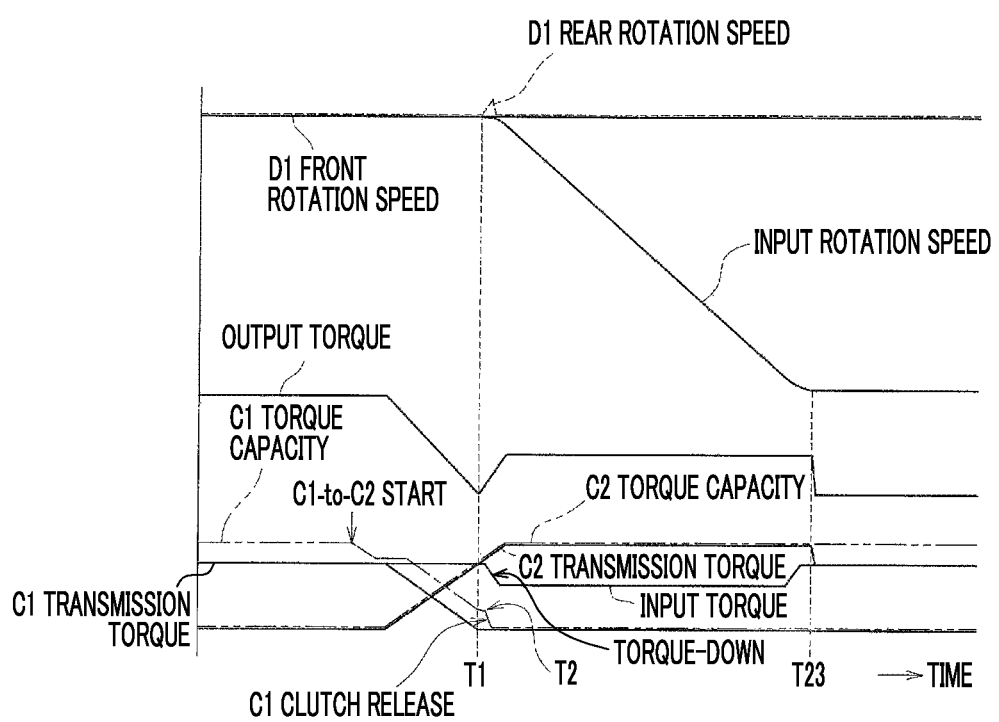
FIG. 7 is a timing chart showing another example of the shock suppression control at the time of the clutch-to-clutch gear shift.

The complete release control of the C1 clutch and the input torque-down control are performed at the time of the inertia phase start in this way, whereby, as shown in FIG. 7, rattling and pull-in of torque (see FIG. 9) are improved and it is possible to achieve reduction in gear shift time (the time from the C1-to-C2 start to the gear shift end T23 shown in FIG. 7 becomes shorter than the time from the C1-to-C2 start to the gear shift end T3 shown in FIG. 5). Then, it is possible to shorten the gear shift time, making it possible to lower heat generation of friction materials of the clutches, and thus, to improve fuel efficiency or durability of the friction material.

Step ST101 to Step ST104 described above are executed by the ECU 100, whereby a "control unit" of the embodiment is realized.

Figure 8:
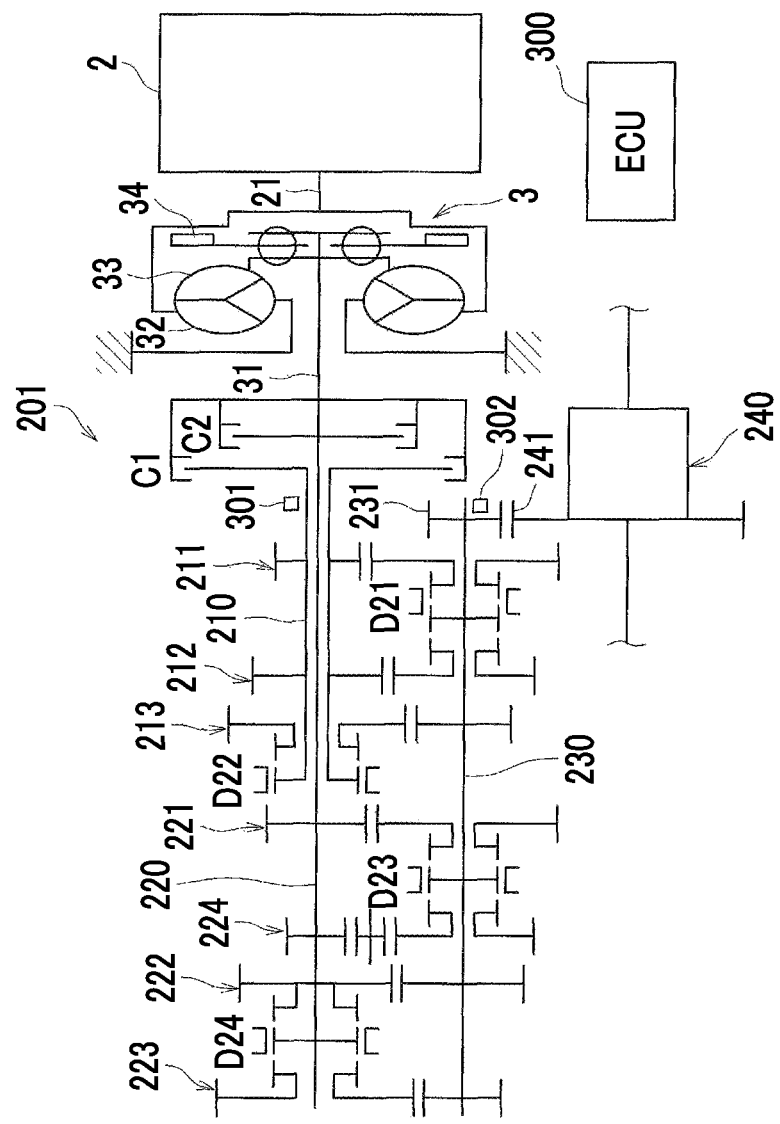
FIG. 8 is a schematic view of the schematic configuration of another example of the power transmission device provided in the vehicle, to which the control device of the embodiment is applied.

Next, another example of the power transmission device provided in the vehicle, to which the embodiment is applied, will be described referring to FIG. 8. A power transmission device 201 of this example is a multi-clutch type transmission device which transmits torque (power) from the engine 2 as a drive power source for traveling to the drive wheels (not shown), and is provided with a torque converter 3, a first clutch C1 (hereinafter, referred to as a C1 clutch), a second clutch C2 (hereinafter, referred to as a C2 clutch), a first input shaft 210, a first speed gear pair 211, a third speed gear pair 212, a fifth speed gear pair 213, a second input shaft 220, a second speed gear pair 221, a fourth speed gear pair 222, a sixth speed gear pair 223, a reverse gear pair 224, an output shaft 230, a differential gear 231, a dog clutch D21 for first speed-third speed switching, a dog clutch D22 for fifth speed, a dog clutch D23 for second speed-reverse switching, a dog clutch D24 for fourth speed-sixth speed switching, and a differential device 240, and the like.

The respective configurations of the engine 2 and the torque converter 3 are the same as those shown in FIG. 1 described above, and thus, detailed description thereof will not be repeated.

The first input shaft 210 is selectively coupled to the turbine shaft 31 of the torque converter 3 through the C1 clutch. When the C1 clutch is in the engagement state (the C2 clutch is in the release state), the torque (input torque) output from the engine 2 is input to the first input shaft 210 through the turbine shaft 31 of the torque converter 3.

The second input shaft 220 is selectively coupled to the turbine shaft 31 of the torque converter 3 through the C2 clutch. When the C2 clutch is in the engagement state (the C1 clutch is in the release state), the torque (input torque) output from the engine 2 is input to the second input shaft 220 through the turbine impeller 33 of the torque converter 3.

A drive gear of the first speed gear pair 211, a drive gear of the third speed gear pair 212, and a drive gear of the fifth speed gear pair 213 are provided in the first input shaft 210. Furthermore, the dog clutch D22 for fifth speed is provided in the first input shaft 210. The dog clutch D22 for fifth speed has the same structure as the dog clutch D1 shown in FIG. 1, and is provided with a synchromesh mechanism (not shown).

A drive gear of the second speed gear pair 221, a drive gear of the fourth speed gear pair 222, a drive gear of the sixth speed gear pair 223, and a drive gear of the reverse gear pair 224 are provided in the second input shaft 220. Furthermore, the dog clutch D24 for fourth speed-sixth speed switching is provided in the second input shaft 220. The dog clutch D24 for fourth speed-sixth speed switching has the same structure as the dog clutch D1 shown in FIG. 1, and is provided with a synchromesh mechanism (not shown).

A driven gear of the first speed gear pair 211, a driven gear of the third speed gear pair 212, a driven gear of the fifth speed gear pair 213, a driven gear of the second speed gear pair 221, a driven gear of the reverse gear pair 224, a driven gear of the fourth speed gear pair 222, and a driven gear of the sixth speed gear pair 223 are provided in the output shaft 230. Furthermore, the dog clutch D21 for first speed-third speed switching and the dog clutch D23 for second speed-reverse switching are provided in the output shaft 230. Each of the dog clutch D21 for first speed-third speed switching and the dog clutch D23 for second speed-reverse switching has the same structure as the dog clutch D1 shown in FIG. 1, and is provided with a synchromesh mechanism (not shown). In addition, the differential gear 231 is provided in the output shaft 230, and the differential gear 231 meshes with a differential ring gear 241 of the differential device 240. The above-described dog clutches D21 to D24 are backlash elements which have a backlash inherent therein.

In the power transmission device 201 having the above-described structure, in a state where the C1 clutch is engaged (the C2 clutch is in the release state) and the dog clutch D21 for first speed-third speed switching is engaged with the first speed gear pair 211, the first power transmission path (for 1st) on the low speed stage side is formed, and the torque from the engine 2 is transmitted to the drive wheels (not shown) by way of the turbine shaft 31 of the torque converter 3, the C1 clutch, the first input shaft 210, the first speed gear pair 211, the dog clutch D21 for first speed-third speed switching, the output shaft 230, the differential gear 231, and the differential device 240. Furthermore, in a state where the C1 clutch is engaged and the dog clutch D21 for first speed-third speed switching is engaged with the third speed gear pair 212, the first power transmission path (for 3rd) on the low speed stage is formed. In addition, in a state where the C1 clutch is engaged and the dog clutch D22 for fifth speed is engaged, the first power transmission path (for 5th) on the low speed stage side is formed.

On the other hand, in a state where the C2 clutch is engaged (the C1 clutch is in the release state) and the dog clutch D23 for second speed-reverse switching is engaged with the second speed gear pair 221, the second power transmission path (for 2nd) on the high speed stage side is formed, and the torque from the engine 2 is transmitted to the drive wheels (not shown) by way of the turbine shaft 31 of the torque converter 3, the C2 clutch, the second input shaft 220, the second speed gear pair 221, the dog clutch D23 for second speed-reverse switching, the output shaft 230, the differential gear 231, and the differential device 240. Furthermore, in a state where the C2 clutch is engaged and the dog clutch D24 for fourth speed-sixth speed switching is engaged with the fourth speed gear pair 222, the second power transmission path (for 4th) on the high speed stage side is formed. In addition, in a state where the dog clutch D24 for fourth speed-sixth speed switching is engaged with the sixth speed gear pair 223, the second power transmission path (for 6th) on the high speed stage side is formed.

Then, in the power transmission device 201 of this example, in a case of switching from the first power transmission path on the low speed stage side to the second power transmission path on the high speed stage side (in a case of an up-shift), the clutch-to-clutch gear shift is performed. For example, in a case of switching from the first power transmission path (for 1st) on the low speed stage side to the second power transmission path (2nd) on the high speed stage side (in a case of an up-shift), clutch switching to operate the C1 clutch in the engagement state to the release side and operating the C2 clutch in the release state to the engagement side in interlocking therewith is performed.

Even at the time of such a clutch-to-clutch gear shift, it is difficult to accurately determine the inertia phase start, and shock occurs for the same reason as described above (the reason described in FIG. 9). Accordingly, even in this example, the inertia phase start is accurately determined using the front-rear rotation speed difference of the dog clutch (the dog clutch D21 for first speed-third speed switching), whereby it is possible to suppress shock. An example of specific control (the shock suppression control at the time of the clutch-to-clutch gear shift) will be described below.

First, the power transmission device 201 of this example is provided with an ECU 300 the same as described above. Furthermore, the power transmission device 201 is provided with a first input shaft rotation speed sensor 301 which detects the rotation speed of the first input shaft 210, and an output shaft rotation speed sensor 302 which detects the rotation speed of the output shaft 230. Respective output signals of the first input shaft rotation speed sensor 301 and the output shaft rotation speed sensor 302 are input to the ECU 300.

The ECU 300 calculates the front-rear rotation speed difference of the dog clutch D21 for first speed-third speed switching based on the respective output signals of the first input shaft rotation speed sensor 301 and the output shaft rotation speed sensor 302. Specifically, the rotation speed on the upstream side of the dog clutch D21 for first speed-third speed switching (on the upstream side in the power transmission direction) is calculated by multiplying the first input shaft rotation speed obtained from the output signal of the first input shaft rotation speed sensor 301 by the gear ratio of the first speed gear pair 211 (a reciprocal of the ratio of the number of teeth of the drive gear to the number of teeth of the driven gear). Furthermore, the output shaft rotation speed obtained from the output signal of the output shaft rotation speed sensor 302 is set as the rotation speed on the downstream side of the dog clutch D21 for first speed-third speed switching, and the difference between the rotation speed on the upstream side and the rotation speed on the downstream side is calculated as the front-rear rotation speed difference of the dog clutch D21 for first speed-third speed switching.

Then, the ECU 300 executes the same control as the control routine (the shock suppression control at the time of the clutch-to-clutch gear shift) of FIG. 4 described above.

Specifically, after the clutch-to-clutch gear shift starts (after the determination of Step ST101 of the control routine of FIG. 4 is YES), it is determined whether or not the front-rear rotation speed difference of the dog clutch D21 for first speed-third speed switching becomes equal to or greater than the predetermined value (Step ST102 of the control routine of FIG. 4), and when the determination result is affirmative (YES), it is determined to be the time of the inertia phase start and the C1 clutch is released (Step ST103). Specifically, the complete release control for draining the hydraulic pressure of the C1 clutch to quickly lower the torque capacity (C1 torque capacity) of the C1 clutch is performed.

Through such control, rattling and pull-in of torque are improved. With this, it is possible to suppress shock at the time of the clutch-to-clutch gear shift.

Even in this example, the same control as the control routine of FIG. 6 is executed, and when the front-rear rotation speed difference of the dog clutch D21 for first speed-third speed switching becomes equal to or greater than the predetermined value after the clutch-to-clutch gear shift starts, the C1 clutch may be released and the input torque-down control may be performed.

In the power transmission device 201 of this example, even at the time of a [3rd→4th] up-shift gear shift and a [5th→6th] up-shift gear shift, since the clutch-to-clutch gear shift is performed between the C1 clutch and the C2 clutch, the above-described shock suppression control may be executed at the time of each clutch-to-clutch gear shift.

The embodiment disclosed herein is illustrative in all sorts of points, and does not serve as grounds for restrictive interpretation. Therefore, the technical scope of the invention should not be interpreted based on only the above-described embodiment, but is determined based on the description of the scope of the claims. Furthermore, the technical scope of the invention includes the equivalents and all sorts of alterations within the scope of the claims.

For example, in the foregoing embodiment, a case where the invention is applied to a vehicle in which only the engine 2 is mounted as a drive power source has been described. The invention is not limited thereto, and can be applied to a hybrid vehicle in which an engine and an electric motor are mounted as a drive power source or an electric vehicle in which only an electric motor is mounted as a drive power source.

The invention can be effectively used in a control device for a vehicle provided with a power transmission device, in which a first power transmission path and a second power transmission path are provided in parallel a power transmission path through which power from a drive power source is transmitted between and engagement and release of a plurality of clutches is controlled to selectively switch between the first power transmission path and the second power transmission path.

What is claimed is:

1. A control device for a vehicle provided with a power transmission device,
the power transmission device including
a first clutch,
a dog clutch, and
a second clutch,
the power transmission device configured to be selectively switched between a first power transmission path and a second power transmission path, the first power transmission path and the second power transmission path being arranged in parallel, such that i) when the first clutch is engaged and the dog clutch is engaged, power from a drive power source is transmitted through the first power transmission path and ii) when the second clutch is engaged, power from the drive power source is transmitted through the second power transmission path, and
the control device comprising
an electronic control unit configured to
i) acquire a front-rear rotation speed difference which is the difference between a rotation speed of the dog clutch on an upstream side in a power transmission direction and a rotation speed of the dog clutch on a downstream side in the power transmission direction, and
ii) when the front-rear rotation speed difference becomes equal to or greater than a predetermined value after a start of clutch-to-clutch gear shift control, perform complete release control of the first clutch, the clutch-to-clutch gear shift control being control for releasing the first clutch and engaging the second clutch from a state where the first clutch is engaged and the dog clutch is engaged.

2. The control device according to claim 1, wherein the electronic control unit is configured to, when the front-rear rotation speed difference becomes equal to or greater than the predetermined value after the start of the clutch-to-clutch gear shift control, perform input torque-down control for lowering input torque to the power transmission device.

* * * * *